(12) United States Patent  (10) Patent No.: US 8,814,015 B2
Gier  (45) Date of Patent: Aug. 26, 2014

(54) AUTOMOTIVE CARGO CARRYING SYSTEMS

(76) Inventor: Heath Gier, Kennewick, OR (US)

(*) Notice: Subject to any disclaimer, the term of this patent is extended or adjusted under 35 U.S.C. 154(b) by 83 days.

(21) Appl. No.: 13/356,505

(22) Filed: Jan. 23, 2012

(65) Prior Publication Data

US 2013/0186923 A1    Jul. 25, 2013

(51) Int. Cl.
*B60R 9/00* (2006.01)
(52) U.S. Cl.
USPC ............ 224/403; 224/402; 224/405; 224/321
(58) Field of Classification Search
CPC ...................................................... B60R 9/00
USPC ............. 224/403, 405, 402, 328, 321; 296/3, 296/100.01, 100.15, 100.16; 410/150; 150/166
See application file for complete search history.

(56) References Cited

U.S. PATENT DOCUMENTS

| | | | | |
|---|---|---|---|---|
| 3,594,035 A | * | 7/1971 | Ferguson | 296/3 |
| 3,765,713 A | * | 10/1973 | Suitt | 296/3 |
| 4,138,046 A | * | 2/1979 | De Freze | 224/405 |
| 4,267,948 A | * | 5/1981 | Lewis | 224/42.34 |
| 4,278,175 A | * | 7/1981 | Jackson | 224/561 |
| 4,405,170 A | * | 9/1983 | Raya | 296/10 |
| 4,659,131 A | * | 4/1987 | Flournoy, Jr. | 296/3 |
| 4,770,458 A | * | 9/1988 | Burke et al. | 296/3 |
| 4,813,734 A | * | 3/1989 | Hoover | 296/100.17 |
| 4,824,157 A | * | 4/1989 | Nielsen et al. | 296/100.01 |
| 5,002,324 A | * | 3/1991 | Griffin | 296/3 |
| 5,037,152 A | * | 8/1991 | Hendricks | 296/3 |
| 5,108,141 A | * | 4/1992 | Anderson | 296/3 |
| 5,137,320 A | * | 8/1992 | Christensen | 296/3 |
| 5,143,415 A | * | 9/1992 | Boudah | 296/3 |
| 5,152,570 A | * | 10/1992 | Hood | 296/3 |
| 5,186,513 A | * | 2/1993 | Strother | 296/100.15 |
| 5,190,337 A | * | 3/1993 | McDaniel | 296/3 |
| 5,192,107 A | * | 3/1993 | Smith, Sr. | 296/3 |
| 5,423,587 A | * | 6/1995 | Ingram | 296/3 |
| D360,614 S | * | 7/1995 | Alcocer | D12/412 |
| 5,431,472 A | * | 7/1995 | Coffland | 296/3 |
| 5,439,152 A | * | 8/1995 | Campbell | 224/405 |
| 5,470,120 A | * | 11/1995 | Christensen | 296/3 |
| 5,494,327 A | * | 2/1996 | Derecktor | 296/3 |
| D367,843 S | * | 3/1996 | Tayar | D12/412 |
| 5,584,311 A | * | 12/1996 | Schaefer | 135/128 |
| 5,725,137 A | * | 3/1998 | Macdonald | 224/405 |
| D394,639 S | * | 5/1998 | Carter | D12/406 |
| 5,806,905 A | * | 9/1998 | Moore | 296/3 |
| 5,836,635 A | * | 11/1998 | Dorman | 296/3 |
| 5,927,782 A | * | 7/1999 | Olms | 296/3 |
| 6,068,168 A | * | 5/2000 | Kreisler | 224/309 |
| 6,186,571 B1 | * | 2/2001 | Burke | 296/3 |
| 6,347,731 B1 | * | 2/2002 | Burger | 224/405 |
| 6,439,646 B1 | * | 8/2002 | Cornelius | 296/164 |

(Continued)

*Primary Examiner* — Justin Larson
*Assistant Examiner* — Lester L Vanterpool
(74) *Attorney, Agent, or Firm* — Mohr Intellectual Property Law Solutions, PC

(57) ABSTRACT

Cargo carrying systems for attaching to a vehicle's cargo area, including a number of cross supports, the adjacent edges of two cross supports creating a storage compartment in which various storage containers are suspended, each cross support having a first and a second leg, each leg being separated from one another by a central member coupled to the top of each leg with a coupler, the bottom of each leg having a mounting bracket for attaching to the vehicle, the legs of adjacent cross supports being joined by a connecting rod.

16 Claims, 5 Drawing Sheets

(56) References Cited

U.S. PATENT DOCUMENTS

| | | | |
|---|---|---|---|
| 6,513,849 B2* | 2/2003 | Carter | 296/3 |
| 6,520,723 B2* | 2/2003 | Christensen | 410/100 |
| 6,942,275 B2* | 9/2005 | Corbett | 296/100.18 |
| 6,971,563 B2* | 12/2005 | Levi | 224/405 |
| 7,198,185 B2* | 4/2007 | Storer | 224/405 |
| 7,322,499 B2* | 1/2008 | Storer | 224/405 |
| 7,419,075 B2* | 9/2008 | Green | 224/405 |
| 7,641,251 B1* | 1/2010 | Stepanians | 296/3 |
| 7,758,091 B1* | 7/2010 | McCall | 296/3 |
| 7,946,457 B2* | 5/2011 | Kramer | 224/405 |
| 8,322,582 B2* | 12/2012 | Flaherty | 224/405 |
| 2003/0168879 A1* | 9/2003 | Grudek | 296/100.15 |
| 2004/0134953 A1* | 7/2004 | Perez | 224/403 |
| 2004/0211802 A1* | 10/2004 | Levi | 224/405 |
| 2004/0232718 A1* | 11/2004 | Kerns | 296/3 |
| 2005/0023314 A1* | 2/2005 | Williams et al. | 224/405 |
| 2007/0278810 A1* | 12/2007 | Collins | 296/3 |
| 2008/0100075 A1* | 5/2008 | Derecktor | 296/3 |
| 2010/0288808 A1* | 11/2010 | Marr, Jr. | 224/403 |

* cited by examiner

AUTOMOTIVE CARGO CARRYING SYSTEMS

BACKGROUND

The present disclosure relates generally to automotive cargo carrying systems and automotive cargo racks. In particular, cargo carrying systems having cargo compartments located between structural cross supports conducive to user access are described.

Carrying, storing, and transporting various cargo on one's automobile is a daily necessity. This need is especially apparent where the user carries cargo related to construction, residential and commercial services, and all aspects of recreation. On a given day a user may be storing or transporting tools, lumber, sheet materials, hardware, camping gear, sports equipment boating supplies, and the like. To fill that need, a number of cargo rack systems have been designed.

Known cargo carrying systems are not entirely satisfactory for the range of applications in which they are employed. For example, existing systems do not utilize available cargo space adequately. Current systems overload the top side of the cargo system putting cargo beyond a user's comfortable reach. Loading cargo in this way presents problems involving accessing cargo, securing cargo, maximizing capacity, and user safety in loading and unloading cargo.

Conventional cargo systems are poorly designed for placing cargo between or underneath the cross-members where a user may more efficiently store cargo within reach. Having a design conducive to alternative cargo storage compartments allows a user to utilize more available carrying space.

In addition, conventional cargo systems lack easily accessible cargo containers. Current containers are designed for top-side mounting and are large and cumbersome. They typically have only one opening and limit the user's ability to access the cargo from different positions or store cargo strategically. A user intending to carry cargo that needs to be accessed frequently must face the task of repeatedly climbing to the top of the cargo system.

The cargo storing and transporting needs of individual users are diverse. Cargo comes in all shapes and sizes and varies in regard to the amount of protection it needs for transport. Existing cargo systems and cargo containers are not sufficiently tailored in size and type to fit specific cargo. Often, the containers are large and rigid causing small cargo to move around during transport and sustain damage. This one-size-fits-all approach to carrying cargo leads to inadequate containment, cargo shifting en route, and limited storage capacity.

Further, known cargo carrying systems must be added either in addition to or in lieu of standard truck canopies. Adding a cargo system over an existing canopy is expensive, cumbersome and limits a user's access to the area covered by the canopy. In the alternative, adding a cargo carrying system in lieu of a standard canopy leaves the cargo and interior of the vehicle storage area unprotected.

Thus, there exists a need for automotive cargo carrying systems that improve upon and advance the design of known systems. Examples of new and useful cargo carrying systems relevant to the needs existing in the field are discussed below.

SUMMARY

The present disclosure is directed to a cargo carrying system for attachment to a vehicle's cargo area, the system having a number of cross supports, the adjacent edges of two cross supports creating a storage compartment in which various storage containers are suspended, each cross support having a first and a second leg, each leg being separated from one another by a central member coupled to the top of each leg with a coupler, the bottom of each leg having a mounting bracket for attachment to the vehicle, the legs of adjacent cross supports being joined by a connecting rod.

DETAILED DESCRIPTION

Figure 1:
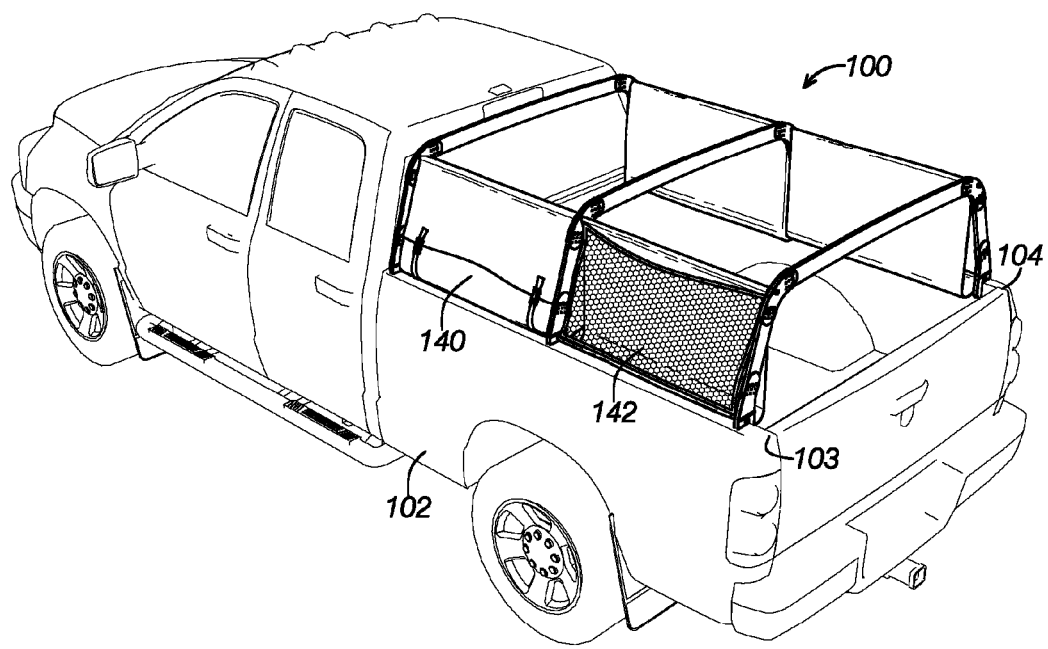
FIG. 1 is a perspective view of a first example of an automotive cargo carrying system.

The disclosed automotive cargo carrying systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various cargo systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-4, a first example of an automotive cargo carrying system, cargo system 100, will now be described. Cargo system 100 includes a plurality of cross supports including a first cross support 110 and a second cross support 111, each cross support comprising vertical legs 112, a central member 116, a coupler 120, a mounting bracket 118, a cargo compartment 130, a connecting rod 132, and a cargo container 140. Cargo carrying system 100 functions to provide cargo carrying, storage, and transport capacity to automobile users.

Cargo carrying system 100 is mounted to a cargo bed 102, having a first lateral boundary 103 and a second lateral boundary 104.

As can be seen in FIG. 1, cross support 110 spans a cargo bed 102 from first lateral boundary 103 to second lateral boundary 104. In the present embodiment cargo bed 102 is a standard pick-up bed. In another application the cargo bed is a flat-bed. In yet other embodiments the cargo bed includes any automotive surface having a first and second lateral boundary for mounting cargo carrying system 100 and sufficient capacity to stow cargo.

Figure 2:
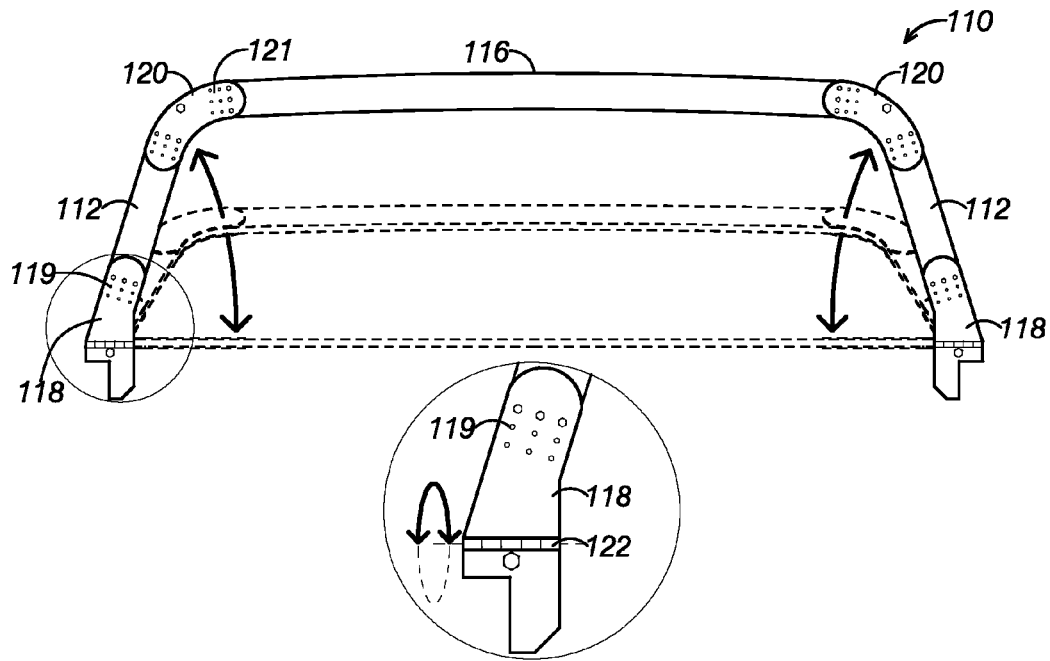
FIG. 2 is a front elevation view of a cross support as shown in FIG. 1 depicting a central member and two vertical legs.

FIG. 2 shows cross support 110 in more detail. First cross support 110 includes: vertical legs 112, a central member 116, a coupler 120, and a mounting bracket 118.

Vertical leg 112 is an elongate body having a bottom and a top end. In the instant example vertical leg 112 has a rectangular shaped cross-section. In another embodiment the cross-section is square. In alternative examples, the cross section is circular. In yet further examples, the vertical leg has any cross sectional shape capable of creating an elongate body.

Vertical leg 112 is a rigid structure that supports central member 116. In the present example, vertical leg 112 consists of a wood core wrapped in fiberglass. In another example, the vertical leg is made from aluminum. In yet other examples, suitable materials for the vertical leg include metal, fiberglass, wood, plastic, and any other material, sufficiently rigid to support the cargo carrying system and associated cargo.

As shown in FIG. 2 and also described above, vertical leg 112 has a bottom end and a top end. The bottom end of vertical leg 112 is attached to a mounting bracket 118. Mounting bracket 118 secures vertical leg 112 to a first lateral boundary 103 of cargo bed 102. Mounting bracket 118 achieves a plurality of fastening positions allowing a user to select for the height and mounting angle of the mounting bracket 118. Vehicles with cargo beds varying in height and width enhance the need for cargo carrying systems capable of accurately engaging and fastening to the bed. Mounting bracket 118 is useable across a range of cargo beds.

In the present example, mounting bracket 118 has a plurality of mounting holes 119. Vertical leg 112 is adjustably received into mounting bracket 118 and fastened into place at a user selectable angle and height via mounting holes 119. In certain other examples, the mounting bracket achieves a plurality of fastening positions via a hinge. In yet other examples, the mounting bracket includes an articulating joint configured to lock in various fastening positions.

Mounting bracket 118 engages cargo bed 102. In the instant embodiment, mounting bracket 118 is notched to receive lateral boundary 103 of cargo bed 102. In this way mounting bracket 118 rests on top of and is secured against lateral boundary 103. In other examples, the mounting bracket is fastened with a clamp as commonly known in the art. In yet other examples, the mounting bracket is bolted into place.

Turning again to FIG. 2, a mounting bracket hinge 122 is described. Cargo carrying system 100 is configured to stow away when not in use. Mounting bracket 118 folds on hinge 122 towards the rear of cargo bed 102, putting cross support 110 in a position that is co-planar with the tops of lateral boundaries 103 and 104. The stowed position achieved via mounting bracket hinge 122 allows a user to hide cargo carrying system 100 when not in use.

In the example shown in FIG. 2, mounting bracket hinge 122 is a standard 360 degree steel hinge as commonly known in the art. In other examples, the hinge is configured to lock in place at user selectable positions. In yet other embodiments entirely, the mounting bracket is non-folding and does not include a mounting bracket hinge.

In the present example, mounting bracket 118 is made from sheet aluminum. In another example, the mounting bracket is made from steel. In yet other embodiments, suitable materials for making the mounting bracket include plastic, fiberglass, plexi-glass, wood, or any material sufficient to adjustably receive vertical leg 112 and mountingly engage cargo bed 102.

The top end of vertical leg 112 is adjustably received into a coupler 120. FIG. 2 shows vertical leg 112 adjustably received into coupler 120 via a plurality of mounting holes 121. FIG. 2 further shows central member 116 adjustably received into coupler 120 perpendicular to vertical leg 112, via mounting holes 121. Coupler 120 couples with the top of vertical leg 112 and a first end of central member 116 in a way similar to mounting bracket 118 described above.

In this example, vertical leg 112 and central member 116 can be coupled to coupler 120 at user selectable angle and height via a plurality of mounting holes 121. In a second embodiment, the coupler achieves a plurality of fastening positions via a hinge. In yet another example, the coupler includes an articulating joint configured to lock in various fastening positions.

In the present example, coupler 120 is made from sheet aluminum. In another example, the coupler is made from steel. In yet other embodiments, suitable materials for the mounting bracket include plastic, fiberglass, plexi-glass, wood, or any material sufficient to adjustably receive vertical leg 112 and central member 116.

Turning again to FIG. 2, coupler 120 is shown having a substantially right angle. In the instant embodiment, vertical leg 112 and central member 116 are configured to intercept coupler 120 approximately at a 90 degree angle. In another example, the coupler has a shape allowing an intercept more obtuse than the present example. In other embodiments the coupler is shaped to allow an intercept more acute than the present example.

Shifting our attention to central member 116, the interaction between a first end of central member 116 and a first coupler 120 and a second end of central member 116 and a second coupler opposite the first coupler 120 is described. Central member 116 is a horizontally disposed elongate body having a first end and a second end opposite the first end.

The first end of central member 116 is adjustably received into first coupler 120 as described above via a plurality of mounting holes. The second end of central member 116 opposite the first end is adjustably received into a second coupler 120.

As can been seen in FIG. 2, central member 116 engages coupler 120 on a first end and opposite the first end engages coupler 120 on a second end. Central member 116 is perpendicularly coupled to vertical legs 112, which are then terminated by mounting brackets 118 to form cross support 110.

Central member 116 in this example has a rectangular shaped cross-section. In another embodiment, the cross-section is square. In alternative examples, the cross section is circular. In yet further examples, the vertical leg has any cross sectional shape capable of creating an elongate body.

Central member 116 is a rigid structure that spans a distance between first and second couplers 120. In the present example, central member 116 consists of a wood core wrapped in fiberglass. In another example, the central member is made from aluminum. In yet other examples, suitable materials for the central member include metal, fiberglass, wood, plastic, and any other material, sufficiently rigid to support the cargo carrying system and associated cargo.

Figure 3:
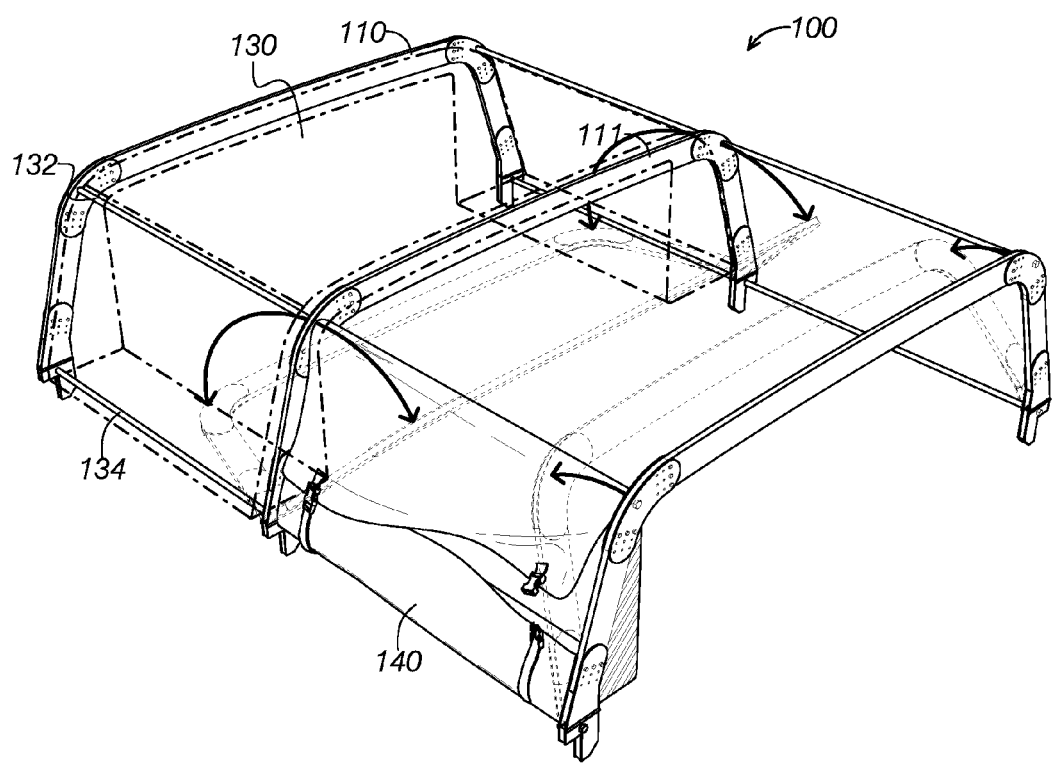
FIG. 3 is a perspective view of a cargo compartment between two cross supports.

Shifting our attention now to FIG. 3, a connecting rod 132 is described. Connecting rod 132 extends between the vertical legs of adjacent cross supports. In the present example, connecting rod 132 is an aluminum tube that connects cross support 110 to cross support 111, passing through cross support 111 and terminating at the final cross support.

The instant example further includes a second connecting rod 134 connecting the mounting bracket of cross support 110 with the mounting bracket of cross support 111, further passing through cross support 111 and terminating at the final cross support mounting bracket. Another example includes fewer connecting rods than the instant example. Yet other examples include more than two connecting rods.

While in the instant example connecting rod 132 is aluminum, in another embodiment the connecting rod is made of steel. In yet other examples suitable materials for the connecting rod include wood, plastic, fiberglass, or any material sufficient to connect adjacent cross supports.

Turning again to FIG. 3, cargo compartment 130 is described. Cargo compartment 130 is an interstitial space having boundaries defined by adjacent cross supports and by lateral boundaries 103 and 104 of cargo bed 102 shown in FIG. 1.

By way of example only, cargo compartment 130 is shown between adjacent cross supports 110 and 111. In this example, cross supports 110 and 111 are representative of any cross supports that are included in cargo carrying system 100. Cargo compartment 130 exists between or immediately adjacent to any cross support included in cargo carrying system 100.

Cargo compartment 130 further defines a space where one or more cargo containers, of which cargo container 140 is one example, are disposed. Cargo container 140 stores cargo associated with cargo carrying system 100. In the present embodiment, cargo container 140 is a non-rigid bag structure having a flap for selectively opening and closing the cargo container allowing a user to access, store, transport, and protect cargo.

Figure 4:
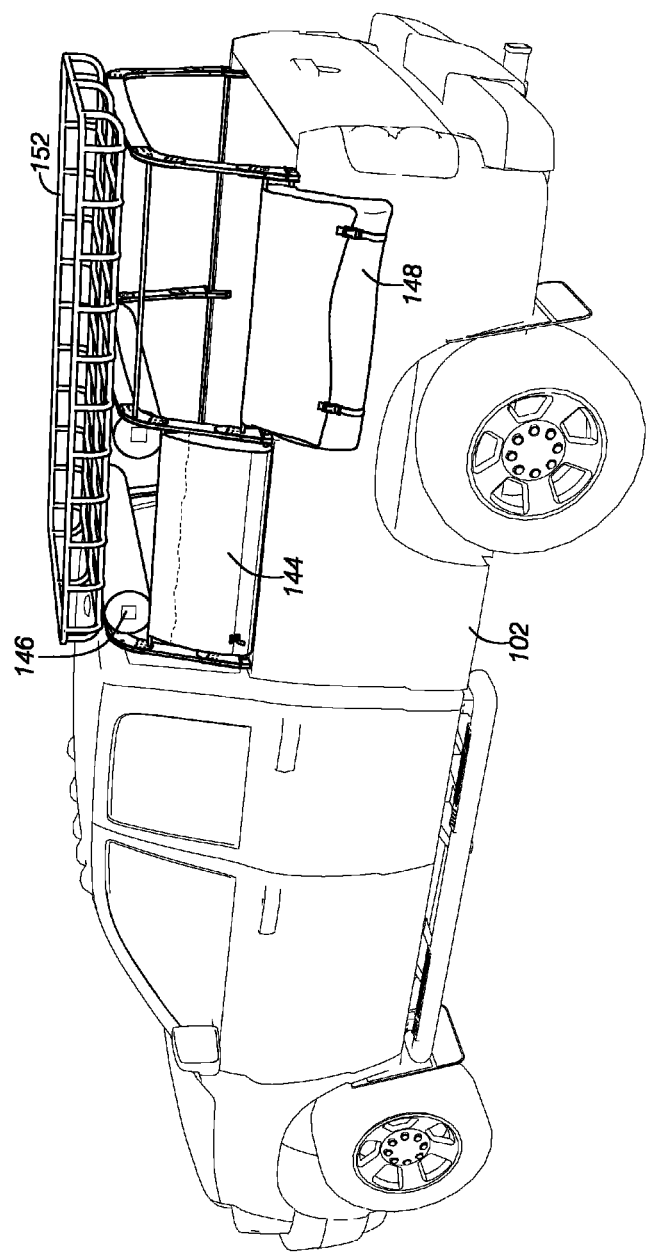
FIG. 4 is a perspective view of an automotive cargo carrying system equipped with a range of cargo containers.

In some embodiments, connecting rod 132 and similar structures provide an attachment point for cargo container 140. FIG. 3, for example, shows cargo container 140 suspended from connecting rod 132 and connecting rod 134. FIG. 4 shows another type of cargo container, saddle bag 148, suspended from connecting rod 134 resting against the side of cargo bed 102.

In the example shown in FIG. 4, cargo container 140 is composed of canvas and fabric. In other embodiments, the cargo container is made of plastic. In yet other examples, the cargo container is a rigid material. In yet further examples, suitable materials for the cargo container include any material capable of attaching to cargo carrying system 100 within cargo compartment 130. By way of example only, cargo containers illustrated in FIGS. 1, 3, and 4, include a cargo net 142, a water bladder 144, a polyvinyl cargo tube 146, and a saddle bag 148.

In addition to the cargo containers described above, cargo carrying system 100 is configured to mountingly receive various rack accessories. FIG. 3, for example, shows cargo cage 152 mounted on top of cargo carrying system 100. Also by way of example, FIG. 7 shows a non-rigid canopy 230 mounted over cargo carrying system 100 creating a barrier between the environment external to the cargo carrying system 100 and the inside of the cargo carrying system.

Figure 5:
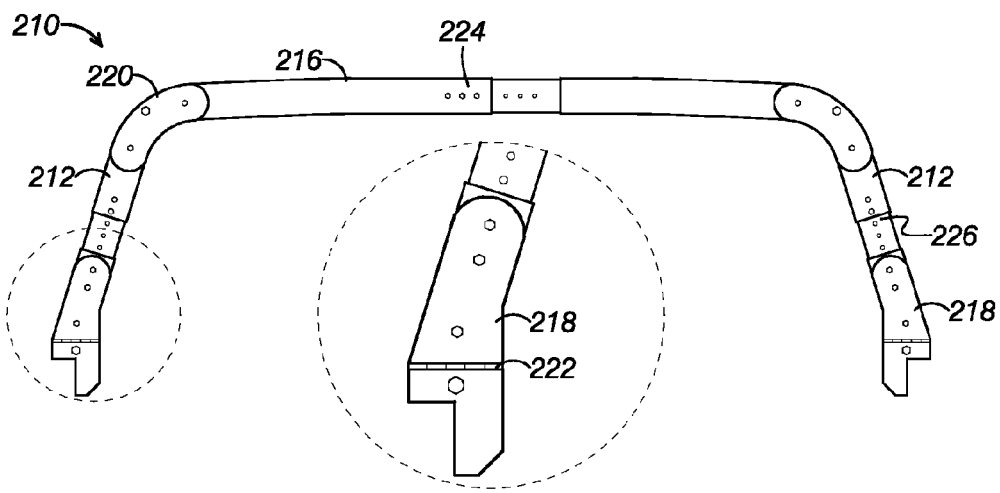
FIG. 5 is a front elevation view of a second example of a cross support depicting an adjustable central member and adjustable vertical legs.
Figure 6:
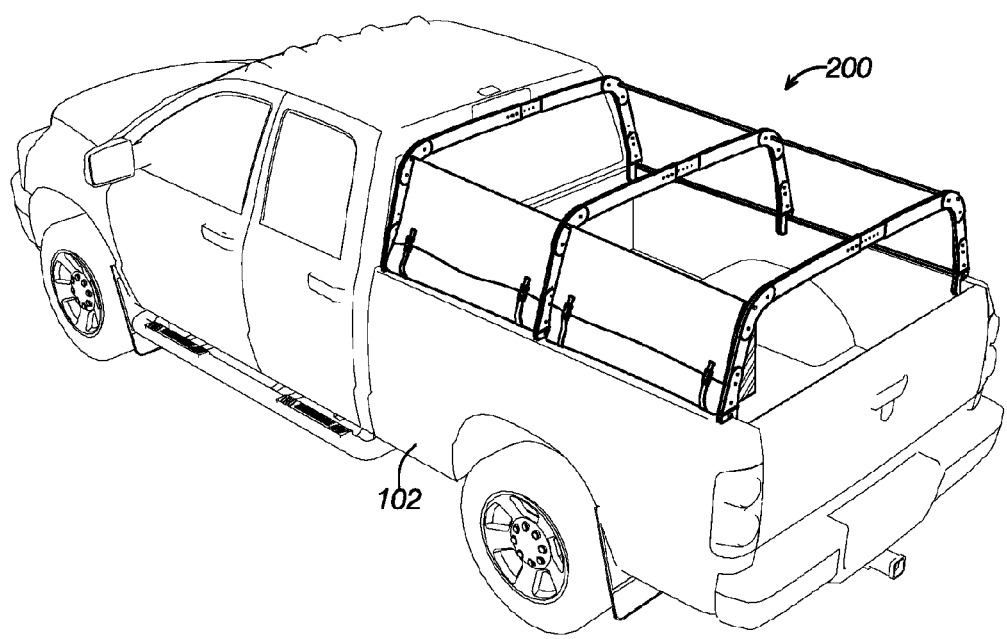
FIG. 6 is a perspective view of a second example of an automotive cargo carrying system depicting adjustable cross supports.
Figure 7:
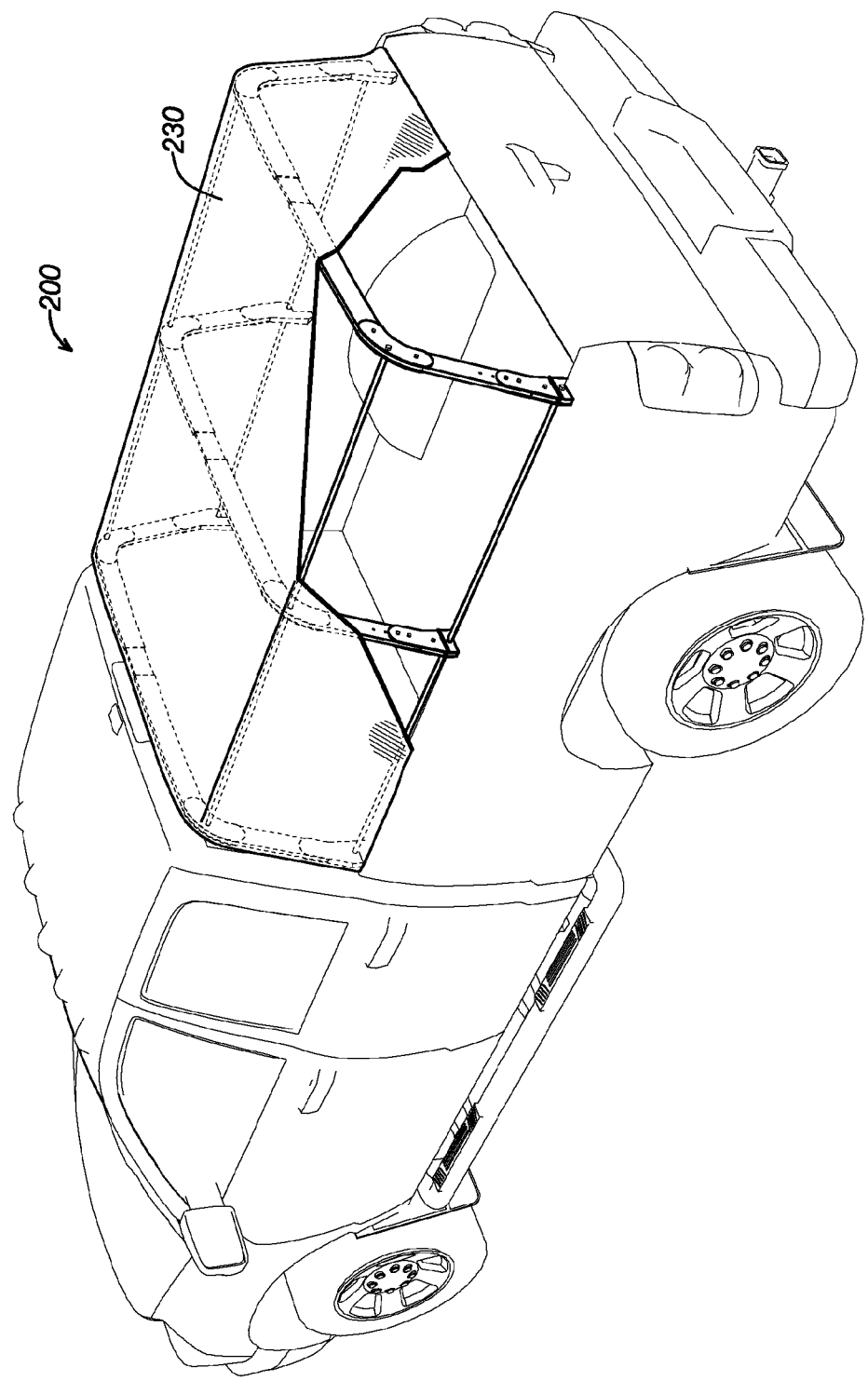
FIG. 7 is a perspective view of an automotive cargo carrying system depicting a removable barrier forming a canopy over the cross supports.

Turning our attention to FIGS. 5-7, a second cargo carrying system example, cargo carrying system 200 will now be described. Cargo carrying system 200 includes many features similar or identical to cargo carrying system 100. Thus, for the sake of brevity, each feature of cargo carrying system 200 will not be redundantly explained. Rather, key distinctions between cargo carrying system 200 and cargo carrying system 100 will be described in detail and the reader should reference the discussion above for features substantially similar between the two systems.

As can be seen in FIGS. 5 and 6, cargo carrying system 200 includes a cross support 210, a mounting bracket 218, an adjustable height vertical leg 212, a coupler 220, and an adjustable length central member 216. The components of cargo carrying system 200 differ slightly from those described in association with cargo carrying system 100 with respect to adjustable height vertical leg 212 and adjustable length central member 216.

Automotive cargo beds vary in width and height relative to one another. In order to overcome these discrepancies and for more accurate fitment of cargo carrying system 200 to cargo bed 102, adjustable height vertical leg 212 and adjustable length central member 216 extend to a user selectable fitment dimension.

Turning our attention to FIG. 5, adjustable height vertical leg 212 is now introduced. Mounting bracket 218 and coupler 220) engage adjustable height vertical leg 212 in a way substantially similar to that described above in cargo carrying system 100. Adjustable height vertical leg 212 is an elongate body having a bottom section and a top section centrally joined via a plurality of mounting holes 226.

The bottom section of adjustable height vertical leg 212 engages and is extendably received into the top section at a user selectable height via mounting holes 226. In the instant example, the bottom section slides within the top section and is bolted together at a user selectable height. In another embodiment, the bottom section is aligned side by side with the top section until mounting holes 226 are sufficiently aligned and can be fastened at a user selectable height.

FIG. 7 shows the adjustable height vertical legs 212 of cargo carrying system 200 equally adjusted to achieve equal heights in each cross support 210. In some examples, cargo carrying system 200 achieves an overall sloping shape where the adjustable height vertical legs are adjusted to be shorter in consecutive cross supports 210. FIG. 6, for example, shows a cargo carrying system having a slope towards the rear of cargo bed 102. In yet other examples, the adjustable height vertical legs are adjusted to random heights to meet user need.

In the present example, adjustable height vertical leg 212 consists of a wood core wrapped in fiberglass. In another example, the vertical leg is made from aluminum. In yet other examples, suitable materials for the vertical leg include metal, fiberglass, wood, plastic, and any other material, sufficiently rigid to support the cargo carrying system and associated cargo.

Additionally, in the instant example, adjustable height vertical leg 212 has a rectangular shaped cross-section. In another embodiment, the cross-section is square. In alternative examples, the cross section is circular. In yet further examples, the adjustable height vertical leg has any cross-sectional shape capable of creating an elongate body.

Now referring to FIGS. 5 and 6, adjustable length central member 216 is now described. Adjustable length central member 216 engages coupler 220 in a way substantially similar to central member 116 described above in cargo carrying system 100. Adjustable length central member 216 is an elongate body having a first section and a second section centrally joined via a plurality of mounting holes 224.

The extendability of adjustable length central member 216 to a user selectable length is the same or substantially similar to that described above in regards to adjustable height vertical leg 212. By way of example, FIG. 6 shows adjustable length central member 216 of cargo carrying system 200, in an extended position to engage cargo bed 102.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A cargo carrying system for mounting onto a cargo bed of a vehicle having a vehicle profile, comprising:
    a first substantially planar cross support including:
        a first vertical leg,
        a second vertical leg spaced from the first vertical leg,
        a first bracket securing the first vertical leg to a first lateral boundary of the cargo bed, the first bracket having a plurality of first alignment elements for adjusting the vertical alignment of the first vertical leg,
        a second bracket securing the second vertical leg to the second lateral boundary of the cargo bed, the second bracket having a plurality of alignment elements for adjusting the vertical alignment of the second vertical leg,
        a first coupler supported on the first vertical leg, the first coupler having a plurality of second alignment elements, and
        a central member adjustably extending between the first coupler vertical leg and the second coupler;
    a second substantially planar cross support spaced from the first cross support and defining a cargo compartment between the first and second cross supports;
    a connecting rod extending between the first cross support and the second cross support; and
    a cargo container supported by the connecting rod in the cargo compartment;
    wherein the plurality of first alignment elements and the plurality of second alignment elements cooperate to selectively conform the horizontal alignment of the central member, the vertical alignment of the first vertical leg, and the vertical alignment of the second vertical leg to define an exterior profile and an exterior footprint of the cargo carrying system that substantially aligns with the vehicle profile.

2. The cargo carrying system of claim 1, wherein the cargo container defines a bag suspended on the connecting rod, and the cargo container is wholly contained within the exterior profile and the exterior footprint of the cargo carrying system.

3. The cargo carrying system of claim 2, wherein the bag includes a multitude of access openings.

4. The cargo carrying system of claim 3, wherein the access openings include a flap for selectively opening and closing the bag.

5. The cargo carrying system of claim 1, wherein the cargo container is a cargo net suspended on the connecting rod, and the cargo container is wholly contained within the exterior profile and the exterior footprint of the cargo carrying system.

6. The cargo carrying system of claim 1, wherein the cross supports are configured to fold flat in a stowing position, the vertical legs of the cross supports lying proximate the lateral boundaries of the cargo bed when configured in the stowing position.

7. The cargo carrying system of claim 6, wherein the first bracket and second bracket are hinged to selectively fold into a stowing position.

8. The cargo carrying system of claim 1, further comprising a vehicle including a cargo bed, the cargo bed defining a conventional pick-up truck bed, an upper lateral surface of the pick-up truck bed supporting the first and the second brackets.

9. The cargo carrying system of claim 8, wherein a first cross-support is mounted at the leading edge of the cargo bed, and the second cross support is mounted closer to the trailing edge of the cargo bed than the first cross support, the second cross-support user-adjusted to a shorter overall height than the first cross support to define a slope, sloping towards the trailing edge.

10. The cargo carrying system of claim 1, wherein the connecting rod is distal the central member.

11. A cargo carrying system for mounting onto a cargo bed of a vehicle, comprising:
    a first substantially planar cross support including:
        a first vertical leg,
        a second vertical leg spaced from the first vertical leg,
        a first bracket securing the first vertical leg to a first lateral side of the cargo bed and being configured to engage the cargo bed at a selectable angle and height, the first bracket having a plurality of fastening positions into which the first vertical leg is adjustably received;
        a second bracket securing the second vertical leg to a second lateral side of the cargo bed and being configured to engage the cargo bed at a selectable angle and height, the second bracket having a plurality of fastening positions into which the second vertical leg is adjustably received;
        a central member extending between the first vertical leg and the second vertical leg, and
        a first coupler supported on the first vertical leg and configured to adjustably receive both the first vertical leg and the central member, the first coupler having a plurality of fastening positions configured to vary the angle and distance that the first vertical leg and the central member are adjustably received into the first coupler;
        a second coupler supported on the second vertical leg and configured to adjustably receive both the second vertical leg and the central member, the second coupler having a plurality of fastening positions configured to vary the angle and distance that the second vertical leg and the central member are adjustably received into the second coupler;
    a second substantially planar cross support spaced from the first cross support and defining a cargo compartment between the first and second cross supports;

a first connecting rod extending between the first and second cross supports on the first lateral side of the vehicle;

a second connecting rod extending between the first and second cross supports on the first lateral side of the vehicle, the second connecting rod below the first connecting rod; and a cargo container supported by the first connecting rod and the second connecting rod in the cargo compartment.

12. The cargo carrying system of claim 11, wherein the cargo container defines a bag removably suspended from the first connecting rod and fixedly secured to the second connecting rod.

13. The cargo carrying system of claim 12, wherein the bag includes an access surface and a protecting surface, the access surface proximate the cargo compartment when the bag is suspended from the first connecting rod.

14. A cargo carrying system for mounting onto a cargo bed of a vehicle, the cargo bed defining a first lateral boundary and a second lateral boundary opposite the first lateral boundary, the cargo carrying system comprising:
   a first substantially planar cross support including:
      a first vertical leg,
      a second vertical leg spaced from the first vertical leg,
      a first bracket securing the first vertical leg to the cargo bed proximate the first lateral boundary,
      a second bracket securing the second vertical leg to the cargo bed proximate the second lateral boundary,
      a first coupler supported on the first vertical leg distal the first bracket,
      a second coupler supported on the second vertical leg distal the second bracket, and
      a central member extending between the first coupler and the second coupler, the central member having a plurality of adjustment elements for adjusting the alignment of the central member relative to the first coupler and the second coupler;
   a second substantially planar cross support spaced from the first cross support and defining a primary cargo compartment between the first and second cross supports proximate the first lateral boundary;
   a third substantially planar cross support spaced from the second cross support opposite the first cross support and defining a secondary cargo compartment between the second and third cross supports proximate the first lateral boundary;
   a first connecting rod extending between the first cross support and second cross support;
   a second connecting rod extending between the second cross support and third cross support;
   a primary cargo container supported by the first and second cross supports in the primary cargo compartment; and
   a secondary cargo container supported by the second and third cross supports in the secondary cargo compartment.

15. The cargo carrying system of claim 14, wherein the primary cargo container is suspended from the first connecting rod and extends beyond the lateral boundary of the primary cargo compartment.

16. The cargo carrying system of claim 14, wherein an internal volume of the first cargo compartment and an interior volume of the second cargo compartment are substantially equal.

* * * * *